United States Patent [19]

Reilly, Jr.

[11] 3,731,062

[45] May 1, 1973

[54] OPTICAL CARD READER DRIVE

[75] Inventor: John J. Reilly, Jr., Orinda, Calif.

[73] Assignee: Binary Systems, Inc., Orinda, Calif.

[22] Filed: May 21, 1971

[21] Appl. No.: 145,983

[52] U.S. Cl. .235/61.11 E, 250/219 D, 340/146.3 H, 340/174.1 G

[51] Int. Cl. ..........G06k 7/14, G06k 9/13, G11b 5/00

[58] Field of Search.................235/61.11 R, 61.11 E, 235/61.11 D, 61.12 R, 61.12 M, 61.6 R; 179/100.2 A; 340/146.3 H, 174.1 G; 250/219 D, 219 DC

[56] References Cited

UNITED STATES PATENTS

| | | | |
|---|---|---|---|
| 3,243,776 | 3/1966 | Abbott et al. | 235/61.11 E |
| 3,553,435 | 1/1971 | Pike | 235/61.11 E |
| 3,555,247 | 1/1971 | Gruczelak | 235/61.11 E |
| 3,185,776 | 5/1965 | Bender | 35/35 C |
| 3,100,834 | 8/1963 | Demer | 235/61.12 M |
| 3,585,366 | 6/1971 | Kern | 235/61.11 E |
| 3,585,590 | 6/1971 | Hoffman | 340/146.3 H |
| 2,746,679 | 5/1956 | Stratton et al. | 235/61.6 R |

OTHER PUBLICATIONS

IBM Tech Discl. Bulletin Hammer et al., "Mark Sensing," Vol. 1, No. 1, June 1968, p. 3.

IBM Technical Disclosure Bulletin Jones et al., "Cable Drive," Vol. 2, No. 5, Feb. 1960.

*Primary Examiner*—Maynard R. Wilbur
*Assistant Examiner*—Thomas J. Sloyan
*Attorney*—Townsend & Townsend

[57] ABSTRACT

A card reader for optically scanning a field of machine-sensible numeric information imprinted on an identifying tag or card attached to an article of merchandise and generating therefrom electronic signals representative of the information. The card is translucent and the imprinting material is opaque with respect to illumination directed against the surface of the card from a light source on one side thereof. Photodetecting means are positioned in light receiving alignment with the light source on the opposite side of the card to record the presence of light passing through the blank areas of the card and the absence of light blocked by the imprinted areas. The photodetector output is connected to a suitable electronic signal generating circuit. Means are provided to move the aligned light source and photodetector unit along the card to scan across the machine readable data field and to return them to their initial position with respect to the card after the scan is completed.

1 Claim, 6 Drawing Figures

INVENTOR.
JOHN J. REILLY JR.
BY
Townsend and Townsend
ATTORNEYS

INVENTOR.
JOHN J. REILLY JR.
BY
Townsend and Townsend
ATTORNEYS

OPTICAL CARD READER DRIVE

The present invention relates to optical character reading devices and is more particularly directed to an apparatus for optically sensing machine-readable numeric information imprinted on a card and generating electronic signals corresponding to the imprinted information.

In my copending U.S. Pat. application entitled NUMERIC FONT AND APPARATUS FOR READING SAME, Ser. No. 674,619 filed Oct. 11, 1967, now U.S. Pat. No. 3,585,589, a stylized machine readable numeric font is disclosed along with logic circuitry for optically reading the numbers and electronically producing a direct conversion to binary coded decimal format. The present invention relates to an electro-mechanical device for optically scanning a ticket having imprinted thereon identifying numeric information in the above machine readable form. The optical card reader of the present invention produces electronic signals representing the information and either records the signals on a self-contained magnetic tape unit or optionally transmits the information directly to a remote location for computer processing.

The card reader of the present invention finds utility in a wide range of commercial situations having particular application to retail merchandise inventory control. For example, each article of merchandise can have an identifying tag attached thereto as by a string, the tag bearing numeric information in machine readable form. When the article is purchased by a customer, the identifying tag is merely inserted into the card reader without the necessity of detachment from the article which it identifies. The information is then recorded on a magnetic tape unit which forms a part of the card reader or transmitted to a central data processing location. This application of the present invention is but one of the many varied uses to which it may be put and numerous diverse applications will be apparent to the reader.

Accordingly, it is a primary object of the present invention to provide a card reading device which optically scans machine readable numeric information imprinted on a card and generates representative electronic signals therefrom.

It is a further object of the present invention to provide an optical reading device which has the capability of either recording the information on magnetic tape internally or transmitting the information to a remote location as electronic signals for immediate on-line data processing or storage for subsequent batched processing.

It is yet a further object of the present invention to provide a self-contained optical card reader which is compact, lightweight and highly portable.

It is a still further object of the present invention to provide an optical card reader adapted to read an identifying card or tag flexibly attached to an article of merchandise as by a string, without requiring the detachment of the card from the article which it identifies.

Other objects, features, and advantages of the present invention will be more readily apparent after reading the following detailed description with reference to the accompanying drawings, wherein.

Figure 1:
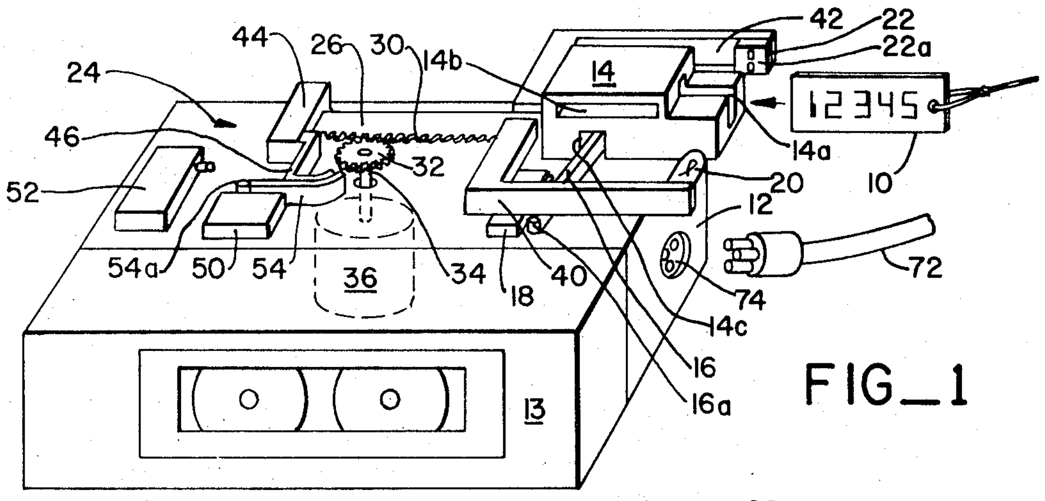
FIG. 1 is a perspective view in pictorial form of a card reader according to a preferred embodiment of the present invention with the electrical interconnections of its various components omitted for clarity.

Referring now to the drawings wherein like numerals in the respective views refer to the same element, a card reader adapted to read a card 10 is provided having its various components mounted to a chassis 12. Also attached to chassis 12 is a self-contained magnetic tape drive unit 13 of conventional design. Tape drive unit 13 includes a two channel magnetic recording head 13a-13b in addition to a standard tape drive mechanism such as commonly found in stereo cassette recorders.

A card-receiving unit 14 is mounted on the upper surface of chassis 12 at one side thereof. Card-receiving unit 14 is provided with vertical slot **14*a* through which card 10 is inserted so that the machine readable numeric information imprinted thereon is disposed within the body of the receiving unit. Since the exposed portion of the card contains the hole for the attaching string, as shown in FIG. 1, correct insertion of the card is insured. Slot 14*a*** has a stepped profile so that a portion of the card remains exposed exterior of the card-receiving unit to facilitate withdrawal of the card after the reading operation.

Card-receiving unit 14 is further provided with a longitudinal illumination slit **14*b*** which extends through the receiving unit so as to allow light introduced at one side of the unit to pass unobstructed through the interior of the unit to the other side where its presence or absence may be registered by an appropriate photosensitive device.

The card-receiving unit also includes aperture 14c which allows switch actuating arm 16 to protrude into the interior of card-receiving unit 14. As will be discussed more fully hereinafter, arm 16 is normally pivotally biased about pin **16*a* away from the contact of start switch 18. When card 10 is inserted through aperture 14a into card-receiving unit 14, the leading edge of the card contacts the free end of actuating arm 16 and urges it in opposition to its natural bias against the contact of start switch 18** thereby actuating the switch.

Card 10 is held within card-receiving unit 14 by appropriate friction means and remains stationary while light source 20 and photosensor 22 are moved along the information bearing portion thereof on opposite sides of illumination slit **14*b*** to optically scan the machine readable information imprinted thereon.

Scan carriage assembly 24 provides the movement of light source 20 and photosensor 22 along card 10 and includes the following components. Carriage rack 26 is extendably mounted within card-receiving unit 14 by slidably engaging guide rails 28. Guide rails 28 and carriage rack 26 are disposed at a level below that of card 10 and actuating arm 16 so that movement of carriage rack 26 as it is extended from or retracted into card reader 14 does not disturb the position of card 10 held therein or the contact between the card and arm 16.

Carriage rack 26 is provided along one edge thereof with a set of longitudinally extending gear teeth 30 which mate with cooperating pinion gear 32. Pinion 32 is horizontally mounted at the upper end of drive shaft 34 which extends vertically from within chassis 12 and operably connects pinion 32 with scan carriage drive motor 36 mounted beneath the upper surface of chassis 12.

Light source 20 and photosensor 22 are connected to scan carriage rack 26 by attachment to the trailing ends of outrigger arms 40 and 42, respectively, which extend around opposite sides of card reader 14. Outrigger arms 40 and 42 position light source 20 and photosensor 22 in registration with one another and in vertical alignment with illumination slit **14*b***.

As drive motor 36 rotates pinion 32 in a counterclockwise direction through shaft 34, carriage rack 26 is extended from within card holder 14 causing the scan carriage assembly 24 to move in the forward direction. This forward motion of scan carriage assembly 24 moves light source 20 and photosensor 22 which are positioned on opposite sides of card-receiving unit 14 in registration with illumination slit **14*b* along the card-receiving unit allowing light from light source 20 to pass there-through in a scan stroke and be recorded by photosensor 22**.

When the card to be read is inserted into card holder 14 through slot **14*a*, the numeric information to be optically scanned is located in vertical registration with illumination slit 14*b*. As scan carriage assembly 24 moves forward, light source 20 sequentially illuminates the machine readable information imprinted on the card. The fibrous material of which the card is made is translucent to the illumination from light source 20 while the ink used to imprint the numeric information thereon is opaque. Thus, the areas bearing no ink allow the illumination from light source 20 to pass through the card so that its presence can be recorded by photosensor 22. Conversely, in areas of the card which are opaque to the illumination from light source 20 due to the presence of ink thereon, the illumination does not pass through the card and its absence will be recorded by photosensor 22. The internal structure of photosensor 22** will be more fully described hereinafter with reference to FIG. 5.

End block 44 is mounted on the leading end of carriage rack 26 and its lower surface slidably contacts the upper surface of chassis 12 to support scan carriage assembly 24. L-shaped actuating shoe 46 having a heel portion 46a and a sole portion 46b is attached to one face of end block 44 and travels with carriage assembly.

Summarizing, scan carriage assembly 24 is moved by drive motor 36 through rack and pinion 30–32 with respect to stationary card 10 and comprises the following components: light source 20 and photosensor 22 are mounted on outrigger arms 40 and 42 which are carried by carriage rack 26, as is end block 44 and shoe 46.

The actuation of the various circuit controlling switches which include start switch 18, home switch 50 and reverse switch 52, in response to the insertion of card 10 and the ensuring movement of scan carriage assembly 24 will now be discussed in reference to FIGS. 2, 3 and 4.

Figure 2:
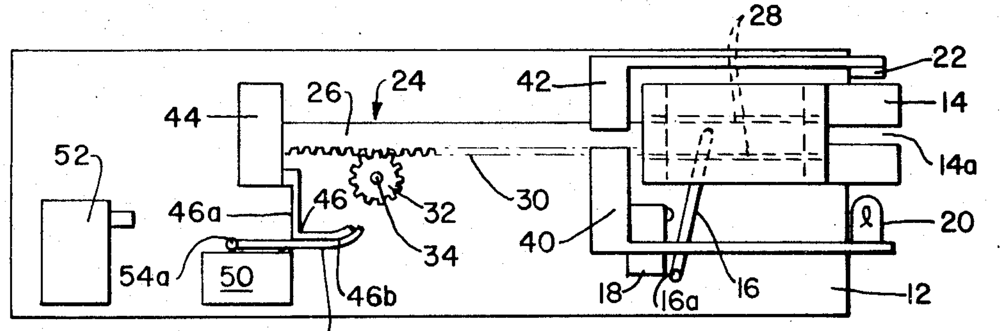
FIG. 2 is a plan view in pictorial form of the card reader of FIG. 1 showing the scan carriage at its initial or home position.

Prior to insertion of card 10 into card-receiving unit 14, scan carriage assembly 24 is in its home position and switches 18, 50 and 52 are in their normal condition as shown in FIG. 2. Actuating arm 16 is pivotally biased away from the contact of start switch 18 which is normally open. Sole portion 46a of shoe 46 bears against home switch actuating arm 54 and opposes the natural tendency of arm 54 to disengage switch 50 due to its pivotal biasing away from switch 50 about pin **54*a*. Home switch 50 is of the single pole double throw type and is maintained in its normal or "A" condition by shoe 46. Reverse switch 52** is normally closed.

Figure 3:
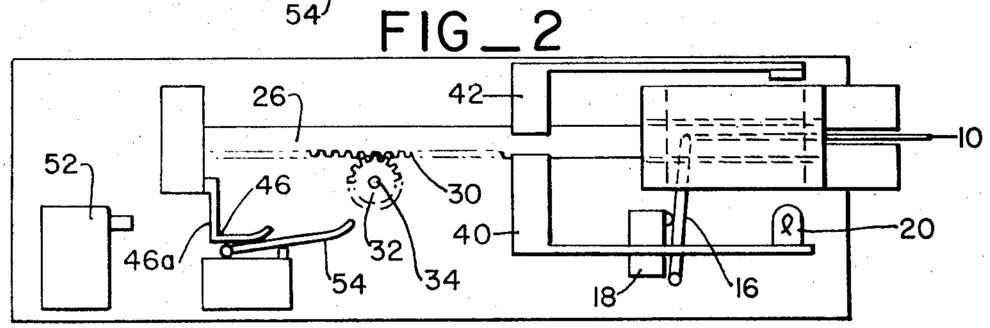
FIG. 3 is a plan view in pictorial form of the card reader of FIG. 1 showing the scan carriage at an intermediate position.
Figure 4:
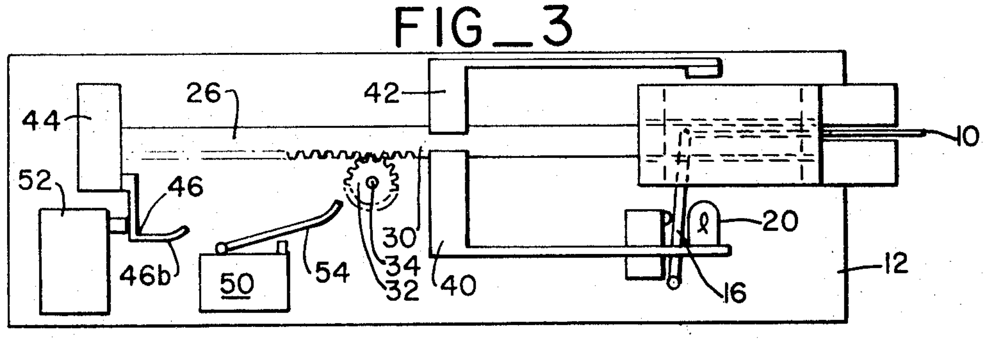
FIG. 4 is a plan view in pictorial form of the card reader of FIG. 1 showing the scan carriage at its fully extended position.

When card 10 is inserted into card-receiving unit 14, as in FIG. 3, the leading edge of card 10 contacts the free end of actuating arm 16 and urges arm 16 against the contact of start switch 18 actuating the switch to a closed condition and initiating the card reading operations. Light source 20 and tape drive motor 13 are thereby energized. Also as will be described hereinafter, shortly after actuation of start switch 18, carriage drive motor 36 is energized in a direction which causes pinion 32 to extendably move carriage rack 26 in the forward direction. This produces the forward movement of the entire scan carriage assembly 24. As the scan carriage assembly travels forward, shoe 46 is moved so as to release its pressure on home switch actuating arm 54 and allow arm 54 to pivot away from home switch 50 and release its contact as shown in FIG. 3. Home switch 50 is thereby actuated to its "B" position, the consequences of which will be described in detail with regard to FIG. 5.

As the scan carriage assembly 24 reaches its position of full extension as shown in FIG. 3, heel portion **46*a* of shoe 46 actuates reverse switch 52 causing a reversal in direction of scan carriage drive motor 36. This reversal of scan motor 36 tends to produce a braking effect on scan carriage assembly 24 and reduce its forward momentum. In addition as will be discussed, momentary actuation of reverse switch 52 de-energizes light source 20 and tape drive 13**.

Scan carriage assembly 24 then begins its return stroke. As the carriage assembly returns to its home position, it reacquires the configuration of FIG. 2 and shoe 46 once again actuates home switch 50 through actuating arm 54 resetting switch 50 to its "A" position and causing scan motor 36 to be de-energized. With scan carriage assembly 24 at rest in its home position, card 10 is removed from card-receiving unit 14 allowing actuating arm 16 to deactuate start switch 18 and the unit returns to its FIG. 1 configuration.

Figure 5:
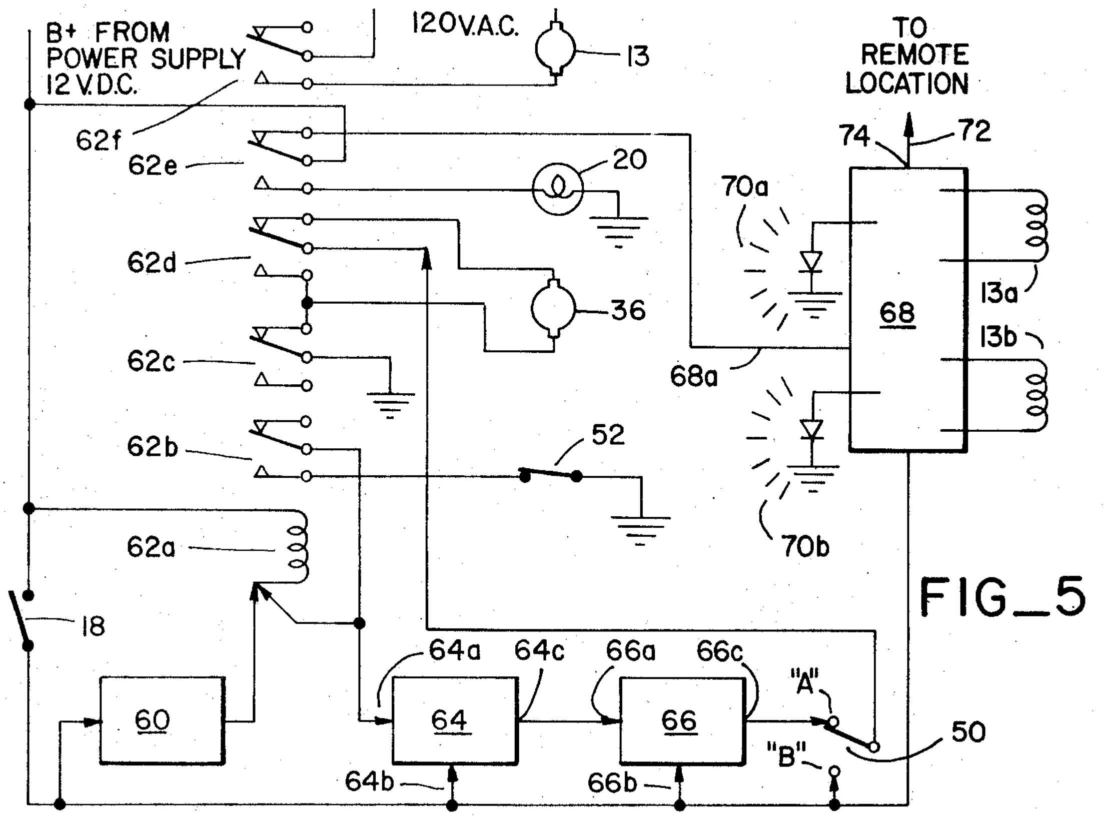
FIG. 5 is a diagrammatic representation of the electrical interconnection between the various electronic and electro-mechanical components of the card reader.

Referring now to FIG. 5, the electrical interconnection of the card reader components will be described. When the card reader of the present invention is connected to a source of a.c. power such as 120v electrical output, the output of a conventional d-c power supply within the card reader is applied to one side of start switch 18. This B+ voltage is of the order of 12 volts. The other side of start switch 18 is connected to the input of relay energizing circuit 60. B+ voltage is also applied to one side of relay coil 62*a* and the other side of coil 62*a* is connected to the output of energizing circuit 60.

Relay energizing circuit 60 is designed so that when a B+ voltage level is suddenly applied to its input, a momentary signal of ground potential appears at its output; thus, when start switch 18 is actuated by arm 16 in response to the insertion of a card 10 within receiving unit 14, circuit 60 provides a momentary B+ path to ground through relay coil 62*a*. An energizing current flows through relay coil 62*a* switching the wipers in relay contact sets 62*b* through 62*f* from the upper "de-energized" contacts to the lower "energized" contacts.

The wiper of contact set 62*b* is connected to the same side of relay coil 62*a* as is the output from relay energizing circuit 60. The lower (energized condition) contact of relay set 62*b* is connected to ground through normally closed reverse switch 52. Thus, when relay coil 62*a* is energized by a momentary ground signal from the output of circuit 60, relay contact set 62*b* switches latching one side of relay coil 62*a* to ground through reverse switch 52 and maintaining relay 62 in its energized state.

Wiper 62*b* is also connected to the input of delay circuit 64. Delay circuit 64 is designed so that a ground signal applied at its control input 64*a* gates a B+ voltage applied at its power input 64*b* through the circuit so as to appear at the output 64*c* after a fixed time delay of the order of 250 milliseconds.

The output of delay circuit 64 is connected to the control input 66*a* of scan motor power circuit 66. Circuit 66 is designed so that a voltage signal applied to its control input 66*a* gates a B+ voltage level applied to its power input 66*b* through the circuit so as to appear at the output thereof, 66*c*.

The output of scan motor power circuit 66 is connected to one terminal of scan motor 36 through the normally active "A" contact of home switch 50 and relay contact set 62*d*. A ground signal is applied to the other terminal of scan motor 36 through relay contact set 62*c*. Further, contact sets 62*b* and 62*c* are interconnected so that when relay 62 switches from a de-energized condition (upper contacts active) to an energized condition (lower contacts active), the power connections to scan motor 36 are reversed, and the drive direction is changed.

From the above it can be seen that 250 milliseconds after relay 62 is energized by actuation of start switch 18, power is applied to scan motor 36 which begins to drive the scan carriage assembly 24 in a forward direction through rack and pinion 30–32. The object of the 250 millisecond delay between actuation of start switch 18 and energization of scan motor 36 is to allow magnetic tape drive 13 to reach a constant operational speed before light source 20 and photocell 22 begin the read scan across the numeric information field imprinted on card 10. The delay also creates a blank space on the magnetic tape which creates an inter-record gap between the data from individual cards.

Energization of relay 62 causes a 120-volt a-c signal to be applied to tape drive motor 13 through relay contact set 62*f*. Energization of relay 62 also applied B+ voltage to light source 20 through relay contact set 62*e*. Thus, light 20 and tape drive 13 are energized immediately upon insertion of card 10 and scan carriage 24 begins its scan cycle 250 milliseconds later.

Home switch 50 is of the single pole-double throw type having the following connections. The wiper of switch 50 is connected to one power input terminal of scan carriage drive motor 36 through relay contact set 62*d*. The normally active "A" contact of switch 50 is connected to the output 66*c* of scan motor power circuit 66. The normally inactive "B" contact of switch 50 is supplied directly with B+ voltage.

With scan carriage assembly 24 in its initial or home position switch 50 connects scan carriage drive motor 36 to the output 66c of scan motor power circuit 66. As the carriage assembly moves forward shoe 46 releases actuating arm 54 and thereby actuates switch 50. This removes the power input to scan drive motor 36 from the output of circuit 66 and latches it directly to the B+ voltage. This is necessary because on the return stroke of the carriage assembly relay 62 will be de-energized and thus delay circuit 64 will not receive a ground signal at its control input 64*a*. As a consequence, circuit 66 will have no output during the return stroke and an alternative means must be provided to maintain power to scan drive motor 36.

In addition to energizing light source 20 when relay 62 is energized, contact set 62*e* also serves the function of clamping signal generating circuit 68 off when relay 62 is de-energized. This is accomplished by applying a B+ voltage to the clamping input 68*a* of circuit 68. The clamping voltage eliminates noise pick up by signal generating circuit 68 and is removed only during the forward travel of scan carriage assembly 24 when relay 62 is energized.

Photosensor 22 comprises a pair of vertically spaced photo conductive diodes 70*a* and 70*b* disposed in vertical alignment with illumination slit 14*b* and in light receiving relationship to light source 20. The two photodiodes are positioned to correspond to the upper and lower information positions in the numeric data field imprinted on card 10 as more fully described in my copending U.S. Pat. application referred to above. Further, an opaque mask 22*a* is placed over the face of photosensor unit 22. Mask 22*a* includes two narrow vertically spaced vertical slits which limit the area sensed on the numeric data field to the central portion of the upper and lower information positions respectively. This compensates for misalignment of the printed numerals on card 10 or misplacement of card 10 within card receiving unit 14.

Photodiodes 70*a* and 70*b* are each connected across a ground path from a corresponding output channel of signal generating circuit 68. When the photodiodes are excited by illumination from light source 20 passing through the unprinted areas of card 10, the diodes become conducting and gate the output from a 2 KC oscillator through each channel to ground. Conversely, when the illumination from light source 20 is directed against an area of card 10 which is opaque to the illumination due to the presence of ink thereon photodiodes 70 become non-conducting and thereby unground the oscillator output directing the 2 KC signal to the magnetic recording heads 13*a* and 13*b* for their respective data channels.

Alternatively, insertion of data transmission line 72 into socket 74 switches the gated oscillator output from the magnetic recording heads 13*a* and 13*b* to a remote location through data transmission line 72.

Figure 6:
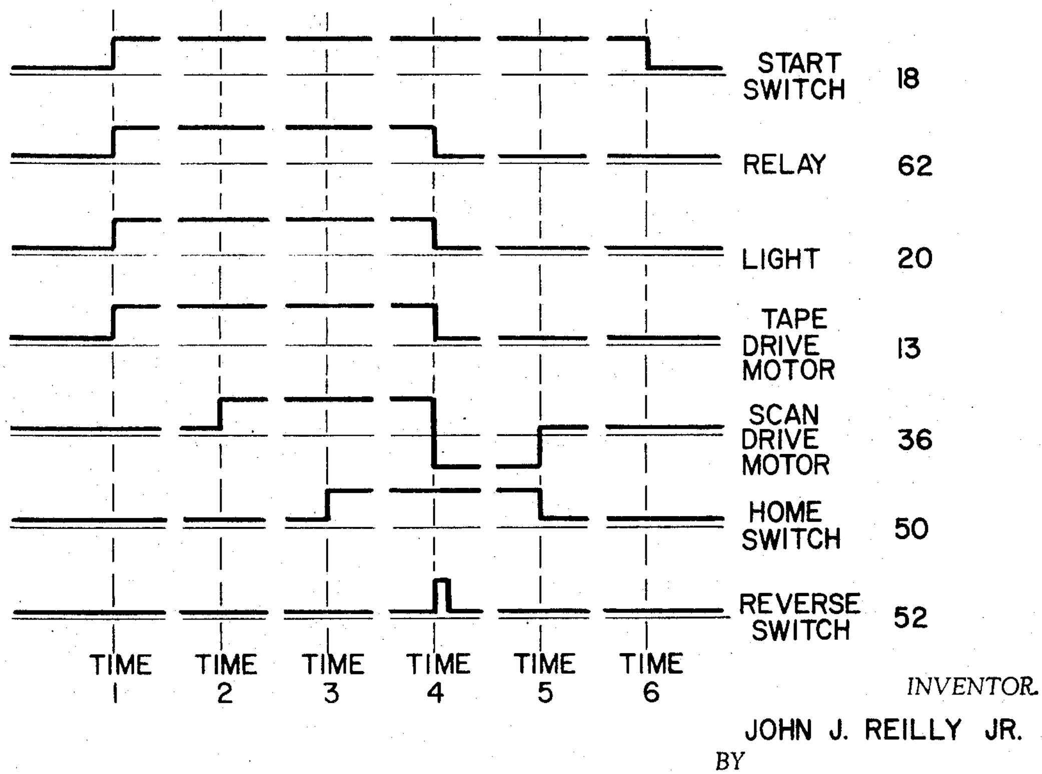
FIG. 6 is a timing diagram illustrating the activation sequence of the various components of the card reader.

Referring now to FIG. 6, the operational sequence of the card reader is as follows:

1. At Time-1 a card 10 is inserted through aperture 14*a* into card receiving unit 14. The leading edge of card 10 contacts the free end of pivotally mounted actuating arm 16 urging arm 16 against start switch 18 which is actuated thereby. Card 10 is retained within card receiving unit 14 by appropriate friction means and start switch 18 remains actuated until the card is removed. Actuation of start switch 18 causes relay energizing circuit 60 to apply an energizing pulse to relay coil 62*a* thereby switching relay contact sets 62*b* through 62*f* with the following results:
   a. Relay contact set 62*b* maintains the energizing current through relay coil 62*a* and latches relay 62 in the energized condition through normally closed reverse switch 52.
   b. Relay contact set 62*b* also applies an initiating signal to the control input 64*a* of delay circuit 64 which starts the 250 ms. delay prior to scan motor 36 energization.
   c. Relay contact sets 62*c* and 62*d* connect the power inputs of scan motor 36 to the output of scan motor power circuit 66 and to ground respectively.
   d. Relay contact set 62*e* energizes light source 20.
   e. Relay contact set 62*f* energizes tape drive motor 13.
2. At Time-2 a control signal appears at the output 64*c* of delay circuit 64 and is applied to the control input 66*a* of scan motor power circuit 66 which in turn gates the B+ voltage applied to power input 66*b* through circuit 66 and relay contact set 62*d* to scan motor 36.
3. At Time-3 scan carriage assembly 24 having begun its forward movement in response to scan motor 36 through rack and pinion 30–32, moves away from its home position and shoe 46 releases arm 54 actuating home switch 50. Actuation of home switch 50 latches scan motor 36 on independently of the output from scan motor power circuit 66. As discussed above, this is necessary because during the reverse movement of scan carriage assembly relay contact set 62*b* will be de-energized, thus, removing the voltage signal from the control input of circuit 66.
4. At Time-4 heel portion 44*a* of shoe 44 actuates normally closed reverse switch 52 ungrounding relay coil 62*a* and de-energizing relay 62 with the following effects:
   a. The ground control signal through relay contact set 62*b* to the control input 64*a* of delay circuit 64 and ultimately to the control input 66*a* of scan motor power circuit 66 is removed.
   b. The power connection to scan motor 36 through relay contact sets 62*c* and *d* are reversed driving scan motor 36 in the opposite direction and moving scan carriage assembly 24 on its reverse stroke.
   c. Light source 20 is de-energized.
   d. Tape drive motor 13 is de-energized.
5. At Time-5 as the carriage returns to the home position, the sole portion 44*b* of shoe 44 re-engages arm 54 and actuates home switch 50 removing power to scan drive motor 36.
6. At Time-6 card 10 is removed from card receiving unit 14, deactuating start switch 18 and returning the circuit to its initial condition prior to Time-1.

One suitable type of signal generating circuit 68 is described in my copending U.S. Pat. application entitled "Numeric Code and Reading System," Ser. No. 198,880 filed Nov. 15, 1971. In this application a circuit is described which operates generally as follows. The output from a 2 kilocycle oscillator is fed to a circuit point in each of the two data channels which is tied to ground when the photodiode associated with that channel is excited by illumination passing through card 10 from light source 20.

Each of the two photodiodes and its associated data channel monitors one of the two vertical information positions on card 10 as carriage assembly 24 moves light source 20 and photodiodes 70*a* and 70*b* along the data field. When the illumination received by either photodiode 70*a* or photodiode 70*b* is cut off by the presence of ink on card 10 corresponding to numeric information thereon the diode is no longer excited and becomes non-conductive. This effectively removes the ground path for the oscillator output in that channel and reverse-biases a diode causing the oscillator output to be directed through the magnetic recording head coil 13 corresponding to that channel.

The effect of this circuit is to record on the magnetic tape two data channels each of which comprises an intermittent sequence of two kilocycle notes corresponding to black areas in each of the two vertical information positions in the data field of card 10. The notes are separated by intervals corresponding to the absence of printed information in the data field.

Upon insertion of data transmission cable 72 in socket 74 the gated oscillator output which would ordinarily be applied to magnetic recording head coil 13*a* and 13*b* is switched to and through data transmission cable 72 for transmission to a remote location for processing.

Although one embodiment of the present invention has been shown and described, it will be obvious that other adaptations and modifications can be made without departing from the true spirit and scope of the invention.

What is claimed is:

1. A scan drive for moving optical reading apparatus along a card bearing a longitudinal field of machine sensible information imprinted thereon, comprising:
   first switch means;
   a card holder including means responsive to the insertion of said card therein for actuating said first switch means;
   a carriage with trailing and leading ends and having its trailing end slideably and extendably mounted within said card holder, said carriage being moveable with respect to said card holder between a home position and a fully extended position;
   illumination means mounted on and carried by said carriage for sequentially illuminating successive segments of said data field in a continuous scan as said carriage is moved with respect to said card holder from said home position to said fully extended position;

photodetector means mounted on and carried by said carriage in light receiving alignment with said illumination means for detecting the presence and absence of light passing through said card from said illumination means;

a shoe mounted to the leading end of said carriage and having two orthogonal actuating surfaces;

second switch means positioned to be actuated by a first one of said shoe surfaces as said carriage is moved from its home position to its fully extended position;

third switch means positioned to be actuated by the second one of said shoe surfaces when said carriage reaches said fully extended position;

means responsive to said first switch means for moving said carriage from said home position to said fully extended position;

means responsive to said third switch means for returning said carriage from its fully extended position to its home position;

means responsive to said second switch means for stopping said carriage after it returns to its home position;

signal generating means for producing a continuous output signal; and, signal gating mans responsive to said photodetector output for gating said continuous signal to an output on occurrence of a preselected photodetector output condition.

* * * * *